(12) United States Patent
Burton et al.

(10) Patent No.: US 7,254,683 B2
(45) Date of Patent: Aug. 7, 2007

(54) SPECULATIVE DATA MIRRORING APPARATUS METHOD AND SYSTEM

(75) Inventors: David Alan Burton, Vail, AZ (US); Noel Simen Otterness, Lafayette, CO (US); Alan Lee Stewart, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 10/700,066

(22) Filed: Nov. 3, 2003

(65) Prior Publication Data

US 2005/0097289 A1   May 5, 2005

(51) Int. Cl.
G06F 12/00 (2006.01)
(52) U.S. Cl. .................. 711/162; 711/151; 711/152
(58) Field of Classification Search .......... None
See application file for complete search history.

(56) References Cited

U.S. PATENT DOCUMENTS

| | | | |
|---|---|---|---|
| 4,965,719 A * | 10/1990 | Shoens et al. ............ 711/100 |
| 5,742,792 A * | 4/1998 | Yanai et al. ............. 711/162 |
| 5,933,653 A | 8/1999 | Ofek ....................... 395/826 |
| 6,148,382 A | 11/2000 | Bitner et al. ............ 711/162 |
| 6,148,383 A | 11/2000 | Micka et al. ............ 711/162 |
| 6,163,856 A | 12/2000 | Dion et al. ............... 714/4 |
| 6,237,008 B1 | 5/2001 | Beal et al. ............... 707/204 |
| 6,269,431 B1 | 7/2001 | Dunham .................. 711/162 |
| 6,275,897 B1 | 8/2001 | Bachmat .................. 711/114 |
| 6,295,575 B1 | 9/2001 | Blumenau et al. ........ 711/5 |
| 6,301,677 B1 | 10/2001 | Squibb .................... 714/13 |
| 6,973,549 B1 * | 12/2005 | Testardi .................. 711/150 |
| 7,096,316 B1 * | 8/2006 | Karr et al. ............... 711/114 |

OTHER PUBLICATIONS

Gawlick, D., "Look Processing in a Shared Data Base Environment", Mar. 1, 1983.*
IBM TDB 01-95 v38 n01 p. 305-306: "Remote Copy Link-level Reconfiguration without Affecting Copy Pairs".
RD 05-01 n445150 p. 856: "Method of the Database backups by using split-mirror copies of Logical Volumes".

* cited by examiner

Primary Examiner—Brian R. Peugh
(74) Attorney, Agent, or Firm—Kunzler & McKenzie

(57) ABSTRACT

An apparatus, method, and system for speculative data mirroring include a rollback log that receives write data corresponding to a write operation that is directed to a storage region within a source volume. Also included is a storage control module that initiates a lock operation on a corresponding storage region within a target volume and a mirror control module configured to send the data corresponding to the write operation to the target volume without waiting for feedback regarding the lock operation. In one embodiment, initiating a lock operation may include sending a lock command to the target volume. Alternatively, the data corresponding to the write operation may initiate the lock operation. In addition, the mirror control module may initiate retransmission of the data in response to subsequent execution of the lock operation. Due to the unique configuration of the present invention, the present invention reduces latencies arising from synchronous mirroring operations, such as lock operations.

29 Claims, 6 Drawing Sheets

SPECULATIVE DATA MIRRORING APPARATUS METHOD AND SYSTEM

BACKGROUND OF THE INVENTION

1. Field of the Invention

The present invention relates to storage systems. Specifically, the invention relates to apparatus, methods, and systems for speculatively mirroring data to a target volume.

2. Description of the Related Art

In this information age, computing devices are often used to process and store vast quantities of data. Businesses and individuals alike increasingly rely on computers to store important personal and business information. As reliance upon machine readable data increases, businesses and individuals are more vulnerable to damage caused by data loss. Consequently, reliability and efficiency of data backup systems have never been more important.

Data backup systems typically create a backup copy of source data associated with a computing device. Source data may include files, storage volumes, data within memory devices, data within storage devices, or the like. If the source data associated with a computing device is corrupted or lost, a data backup system can be used to replace the corrupted or lost source data with a backup copy. The degree of similarity, and thus reliability, between the backup copy and the source data may vary, however, depending on how often the backup copy is updated to match the source data. If the backup copy is updated in step with the source data, the backup copy is said to be a "mirror" of the source data and is therefore "consistent" with the source data.

In one form of data mirroring, data is written to two more storage volumes in parallel. As a result, one or more redundant copies of the data is always available in case one of the volumes fails. In remote data mirroring systems, data is written to the source volume at one location and to the one or more target volumes at remote locations. Often, a transmission link facilitates data transmission between a source storage controller connected to the source volume and target storage controllers connected to the target volumes.

FIG. 1 is a block diagram illustrating a typical prior art remote data mirroring system 100. The depicted prior art data mirroring system 100 includes a host 110, a file system 112, a source storage controller 114a, a target server 120, a file system 122, a target storage controller 114b, one or more source volumes 130a and target volumes 130b, and a transmission link 150.

The host 110 may request data from, or send data to, the source storage controller 114a via the file system 112. The file system 112 translates operating system calls to storage related commands recognized by the source storage controller 114a. Similarly, the target server 120 may request data from, or send data to, the target storage controller 114b via the file system 122, which translates operating system calls to storage related commands recognized by the target storage controller 114b.

In response to the reception of the storage related commands, either from the operating system or directly from an application or utility, the source storage controller 114a translates the storage related commands into storage operations on the source volumes 130a. Likewise, the target storage controller 114b translates storage related commands into storage operations on the target volumes 130b. Examples of storage operations include read operations, write operations, copy operations, and the like.

During data mirroring, the host 110 sends write data to the source volumes 130a via the file system 112 and the source storage controller 114a. The source storage controller 114a conducts corresponding write operations on the source volumes 130a while also sending a copy of the data to the target storage controller 114b via the transmission link 150. In response, the target storage controller 114b writes the copied data to the target storage volumes 130b. Thus, the target volumes 130b may contain a relatively up-to-date copy of the source volumes 130a and "mirror" the source volumes 130a in a substantially continuous manner.

The bandwidth available to the transmission link 150 is often much less than the bandwidth between the source storage controller 114a and the source volumes 130a. Furthermore, synchronous mirroring operations often require the source storage controller 114a to wait for completion of the mirrored operation on the target volume before proceeding to a subsequent operation. Consequently, storage operations conducted by the source storage controller 114a may be reduced to a rate matching the transmission rate of the transmission link 150. Data throughput in the remote data mirroring system 100 is thus constrained by the relatively low bandwidth of the transmission link 150, resulting in inefficient system performance.

One technique used to improve data throughput is known as asynchronous replication. In this technique, a buffer is used to hold data that has not yet been sent across the transmission link 150 to a target storage controller 114b. Data corresponding to read and write operations on the source volumes 130a are stored in the buffer and are sent to the target storage controller 114b as soon as the transmission link 150 will allow. Thus, the source storage controller 114a can read and write to the source volumes 130a at close to full speed, independent of the transmission rate of the transmission link 150. While useful for some operations, asynchronous replication does not work for every operation. Some operations such as locking operations have required synchronization for proper completion.

Locking operations lock a region of a storage volume, effectively preventing all but certain read and write operations from accessing the locked region. Locking operations ensure orderly access to memory that may be updated by multiple processes. In certain embodiments, locking operations include read locks and/or write locks wherein write locks permit only read operations by another process, while read locks permit neither read nor write operations by another process.

To initiate locking operations, the source storage controller 114a sends a lock request to the target storage controller 114b. When the target storage controller 114b has granted the lock, the target storage controller 114b responds by sending a confirmation message to the source storage controller 114a. The confirmation message informs the source storage controller 114a that the target storage controller 114b is ready to receive additional read and write operations.

In the aforementioned scenario, the target controller 114b cannot grant a lock on a requested region until the target storage controller 114b is finished reading or writing to the requested region. In addition, the source storage controller 114a must wait for the confirmation message before sending read and write data. Consequently, the delays associated with heretofore synchronous operations, such as lock operations, significantly reduce the efficiency, reliability, and performance of the remote data mirroring system 100.

Accordingly, what is needed is a data mirroring system that overcomes transmission latencies and other delays associated with heretofore synchronous operations, such as locking operations. In particular, what is needed are apparatus, methods, and systems for conducting locking operations on remote storage volumes in an asynchronous manner.

BRIEF SUMMARY OF THE INVENTION

The present invention has been developed in response to the present state of the art, and in particular, in response to the problems and needs in the art that have not yet been fully solved by currently available data mirroring systems. Accordingly, the present invention has been developed to provide an apparatus, method, and system for mirroring data that overcomes many or all of the above-discussed shortcomings in the art.

In a first aspect of the present invention, an apparatus for speculative data mirroring includes a rollback log configured to recieve data corresponding to one or more write operations directed to a selected storage region within a source volume. Also included is a mirror control module configured to initiate a synchronous operation on a corresponding storage region within a target volume and to send the data corresponding to the write operations to the target volume without waiting for feedback regarding the lock operation. The synchronous operation may be a lock operation. The mirror control module may also be configured to remove the data corresponding to the write operations in response to successful completion of the write operations on the target, or resend the data corresponding to the write operations in the event of errors. Due to the unique configuration and operation of the elements of the present invention, latencies associated with synchronous mirroring operations, such as lock operations, are substantially eliminated by assuring that operations will be successful.

In certain embodiments, commands are stored along with data in the rollback log that indicate what operations are to be performed on the target volume. The apparatus may also include a source storage controller operably connected to the source volume and a target storage controller operably connected to the target volume. In certain embodiments, a transmission link operably connects the source storage controller to the target storage controller.

Synchronous mirroring operations, such as lock operations, are assumed to be successfully completed. For example, in conjunction with a lock operation, a lock command may be sent to the target volume. The source controller may then proceed to lock a region in the source volume and conduct one or more write operations to that region without waiting for feedback regarding the locking operation in the target volume. In the event of a failed operation, the commands and data within the rollback log may be referenced to reattemp the failed operation.

In certain embodiments, initiating a lock operation on a selected target volume region locks the selected region of the target volume, allowing write operations to be conducted on the selected region. In other embodiments, write operations and lock operations are essentially atomic, and sending data corresponding to a write operation to the target controller automatically initiates a lock operation on the selected target volume region specific to that write operation.

Other functions of the mirror control module may include halting transmission of the data corresponding to the write operation in response to rejection of the lock operation and resuming transmission of the data stored in the rollback log in response to subsequent execution of the lock operation. In another embodiment, the mirror control module initiates retransmission of the data in response to subsequent execution of the lock operation. Different embodiments may be used in different systems to achieve optimal performance, depending on various characteristics of the local and remote storage systems.

In another aspect of the present invention, a method for speculative data mirroring includes receiving data corresponding to one or more write operations to a storage region within a source volume, inserting the data into a rollback log, initiating a synchronous operation on a corresponding storage region within a target volume, and sending the data corresponding to the write operation to the target volume without waiting for feedback regarding the lock operation.

Certain embodiments of initiating a lock operation may include sending a lock command to the target volume. In one embodiment, sending a lock command to the target volume facilitates locking a region of the target volume, allowing multiple write operations to be conducted on the locked region. In another embodiment, locking of the target volume region occurs automatically in response to receiving data corresponding to a write operation at the target volume or controller. In certain embodiments, speculative execution may not apply to read locks and any operations associated therewith.

In conjunction with inserting data corresponding to write operations into the rollback log, synchronous commands, such as lock commands, may also be inserted into the rollback log and removed from the rollback log in response to successful execution of the corresponding operations on the target volume. Moreover, the data corresponding to operations such as write operations may also be removed from the rollback log in response to successful execution of corresponding operations on the target volume.

One embodiment of the method for speculative data mirroring includes halting transmission of the data corresponding to the write operations in response to rejection of the a lock operation on the target volume. The method may subsequently resume transmission of the data stored in the rollback log in response to successful execution of the lock operation.

The speculative data mirroring method provides a throughput-efficient process for mirroring data. This efficiency is achieved, in part, by conducting subsequent operations, such as write operations, without waiting for feedback regarding the initial operation, such as reception, completion, or rejection of the initial operation or command associated therewith.

Various elements of the present invention may be combined into a system for speculative data mirroring. In one embodiment, the system for speculative data mirroring includes a source storage controller operably connected to a source volume, a target storage controller operably connected to a target volume, a rollback log, a storage control module operably connected to the target storage controller, and a mirror control module operably connected to the source storage controller.

The rollback log may receive data corresponding to operations such as write operations to a storage region within the source volume, and the storage control module may initiate a lock operation on a corresponding storage region within the target volume. In addition, the mirror control module may send the data corresponding to the write operation to the target volume without waiting for feedback regarding the lock operation.

The various elements and aspects of the present invention facilitate throughput-efficient transmission of data within a data mirroring system. These and other features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

It will be readily understood that the components of the present invention, as generally described and illustrated in the Figures herein, may be arranged and designed in a wide variety of different configurations. Thus, the following more detailed description of the embodiments of the apparatus, method, and system of the present invention, as represented in FIGS. 2 through 6, is not intended to limit the scope of the invention, as claimed, but is merely representative of selected embodiments of the invention.

Many of the functional units described in this specification have labeled as modulates, in order to more particularly emphasize their implementation independence. Modulates may be implemented as instructions or logic executable by a processor and stored on a computer readable storage medium. For example, a module may be implemented as a hardware circuit comprising custom VLSI circuits or gate arrays, off-the-shelf semiconductors such as logic chips, transistors, or other discrete components. A module may also be implemented in programmable hardware devices, such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
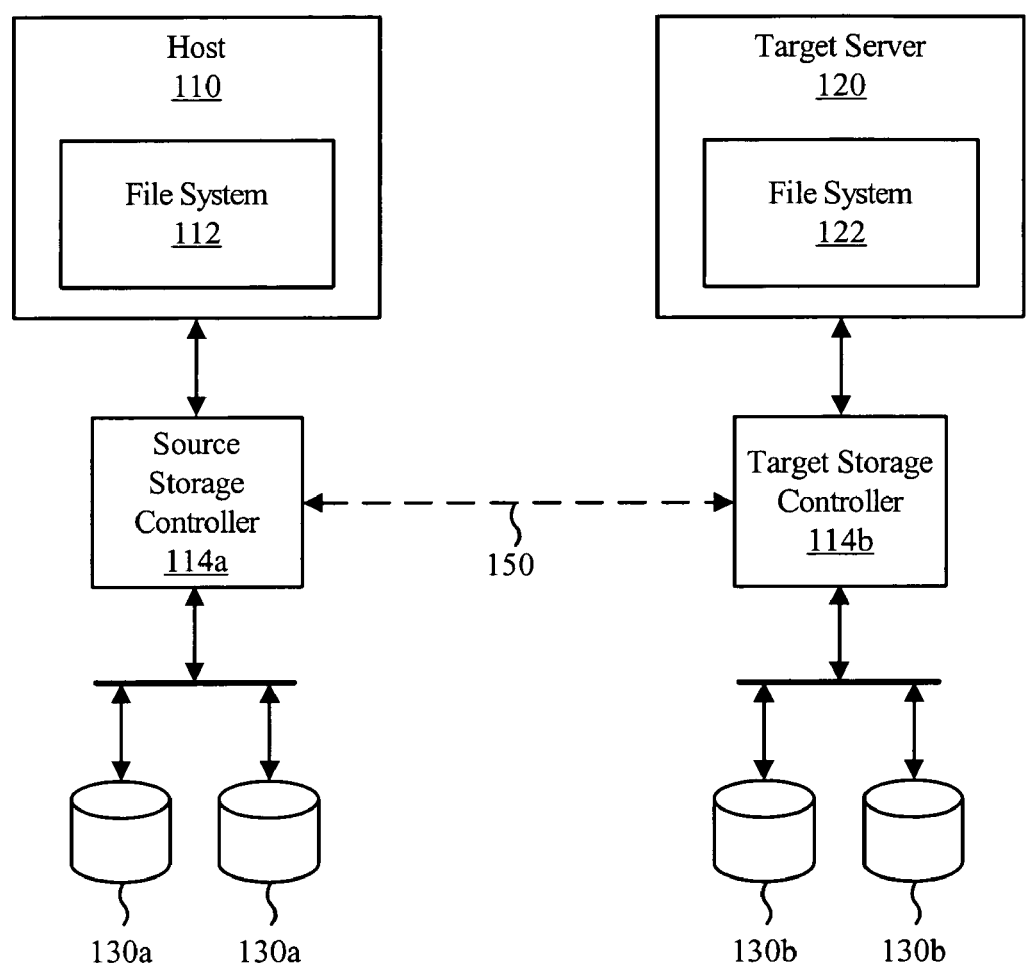
FIG. 1 is a block diagram illustrating a typical remote data mirroring system of the prior art.
Figure 2:
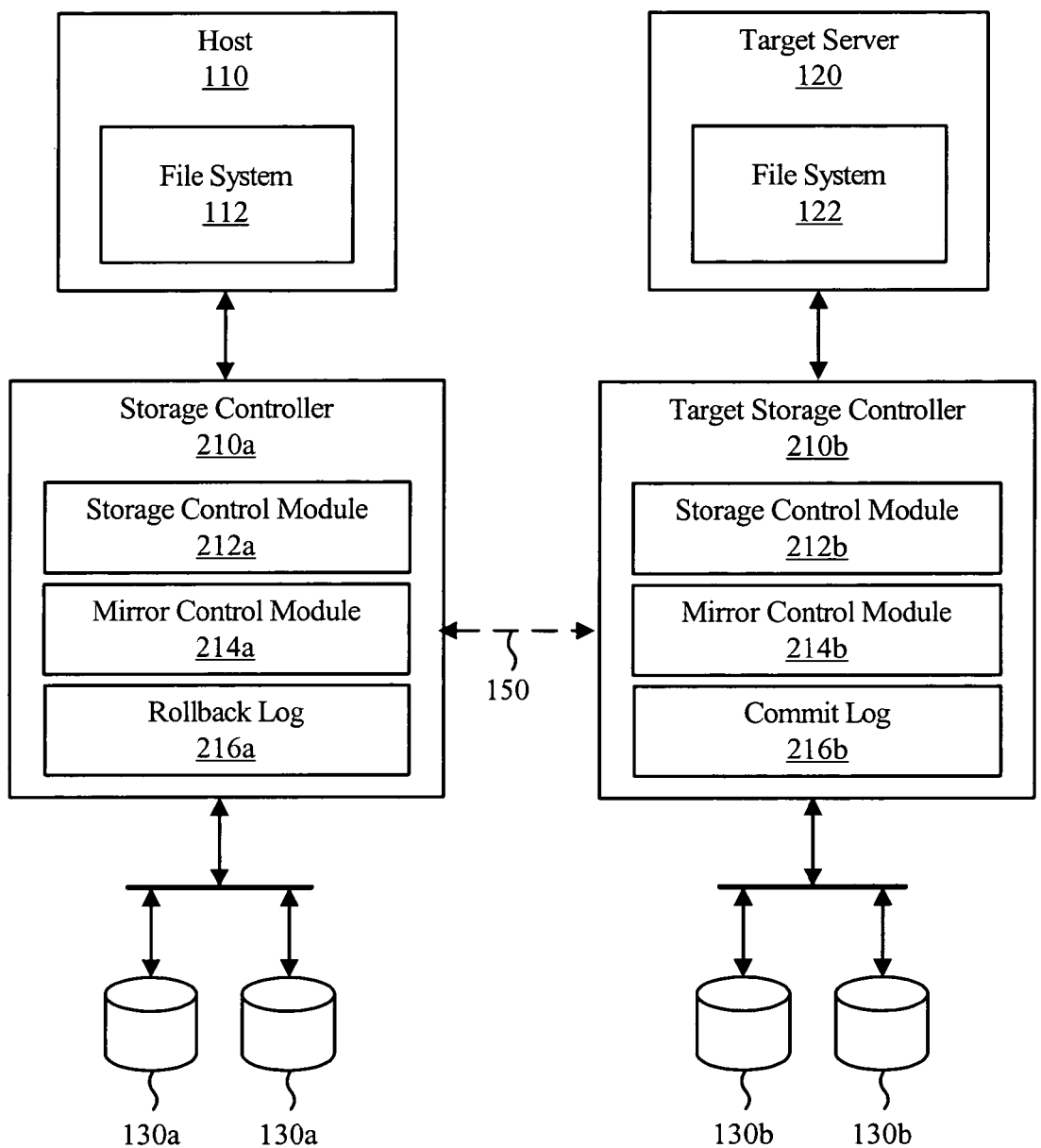
FIG. 2 is a block diagram illustrating one embodiment of a speculative data mirroring system of the present invention.

FIG. 2 is a block diagram illustrating one embodiment of a speculative data mirroring system 200 of the present invention. The depicted speculative data mirroring system 200 includes a host 110, a file system 112, a target server 120, a file system 122, one or more source storage volumes 130a, one or more target storage volumes 130b, a transmission link 150, a source storage controller 210a and a target storage controller 210b. The depicted source storage controller 210a further includes a storage control module 212a, a mirror control module 214a and a rollback log 216a, while the depicted target storage controller 210b further includes a storage control module 212b, a mirror control module 214b, and a commit log 216b.

The speculative data mirroring system 200 reduces delays associated with synchronous operations by assuming that a synchronous operation, such as a lock operation, will succeed on the target system and by providing means for completing failed operations. For example, in the event that the synchronous operation does not succeed, the rollback log 216a and the commit log 216b may be used to reattempt the failed operation and any subsequent operations associated therewith, such as write operations.

The source controller 210a in one embodiment initiates a synchronous operation, such as a lock operation, on the target volume 130b and then immediately conducts subsequent operations, such as write operations, without waiting for feedback before sending the write operations regarding the synchronous operation. Not waiting for feedback increases the performance of the speculative data mirroring system 200.

In one embodiment, initiating a lock operation includes sending a lock command from the source storage controller 210a to the target storage controller 210b via the transmission link 150. The lock command may include an instruction to lock a region of the target volume 130b spanning several logical block addresses (LBA's). Alternatively, in one embodiment, an implied lock operation is initiated by sending data corresponding to a write operation to the target storage controller 210b.

Speculative operations may be facilitated by the source storage controller 210a shown attached to the host 110 and the target storage controller 210b shown attached to the target server 120. The host 110 and target server 120 interact with the storage controllers 210 to read to and write from the source volumes 130a and the target volumes 130b, respectively.

During read and write operations, the host 110 may send read and write requests to the source storage controller 210a via the file system 112, which translates operating system calls into commands for the source storage controller 210a. Similarly, the target server 120 may request data from and send data to the target storage controller 210b via the file system 122.

The source storage controller 210a may translate the commands from the file system 112 into operations on the source volumes 130a. Likewise, the target storage controller 210b may translate the commands from the file system 122 into operations on the target volumes 130b. Operations may include read operations, write operations, copy operations, and the like.

The storage control modules 212, the mirror control modules 214, and the logs 216 are operably connected to the local storage controller 210. In the depicted embodiment, the aforementioned modules are contained within the storage controllers 210. In alternative embodiments, each of the aforementioned modules may be contained within the host 110, the target server 120, or the like according to the architecture of the particular system in which the present invention is deployed.

The storage control modules 212 may initiate synchronous operations, such as lock operations, on storage regions within the volumes 130. The mirror control modules 214 may insert, retrieve, and remove commands or data corresponding to synchronous operations into their respective logs 214. Additionally, the mirror control modules 214 may send the commands or data stored in the logs 216 to another controller 210.

In certain embodiments, the mirror control module 214a sends a synchronous command, such as a lock command, to the target storage controller 210b, and subsequently sends additional commands and data (such as write commands and write data) that are associated with the synchronous command to the target storage controller 210b without waiting for feedback regarding the synchronous command such as reception. The feedback may include completion or rejection of the synchronous command or operations associated therewith. In certain embodiments, operations related to read locks may need to wait for completion of any pending write lock operations and associated operations as well as acknowledgment of the read lock operation. In the aforementioned embodiments, speculative execution may not apply to read locks and the operations associated therewith.

The mirror control module 214a is in one embodiment configured to remove a command from the rollback log in response to successful execution of the command on the target volume 130b. In addition, the mirror control module 214a may remove data corresponding to a command from the rollback log 216a in response to successful execution of the command on the target volume 130b.

The depicted logs 216 are in one embodiment a data structure such as a linked list, an array, a queue, or the like. As such, the logs 216 may operate on a first-in, first-out (FIFO) basis. For example, the mirror control module 214 may remove data or commands from a log 216 in the order that the data or commands were inserted into the log 216. In addition, the logs 216 may be stored in a processor memory within a storage controller 210. Alternatively, the logs 216 may be stored in a volume 130. In one embodiment, the logs 216 are stored within the storage controllers 210, and the logs 216 may be expanded onto the volume 130 in response to receiving large amounts of commands or data.

In one embodiment, the volumes 130 include one or more storage devices, such as hard disk drives. The volumes 130 may also be a redundant array of independent disks (RAID). Though not depicted, the storage controllers 210 may be redundant controllers such as is common with RAID systems. In such a configuration, the modules depicted within the storage controllers 210 may be replicated on each controller in a manner that is familiar to one of skill in the art. For example, in one embodiment, a redundant storage controller 210a connected to the host 110 may also include a storage control module 212a, a mirror control module 214a, and a rollback log 216a. A redundant storage controller 210b connected to the target server 120 may also include a storage control module 212b a mirror control module 214b, and a commit log 216b.

The various elements of the speculative data mirroring system 200 facilitate enhanced data mirroring performance. This performance is enhanced, in part, by the mirror control module 214, which speculatively sends commands and data corresponding to synchronous operations prior to receiving acknowledgement of the synchronous operation on the target volume 130b.

Figure 3:
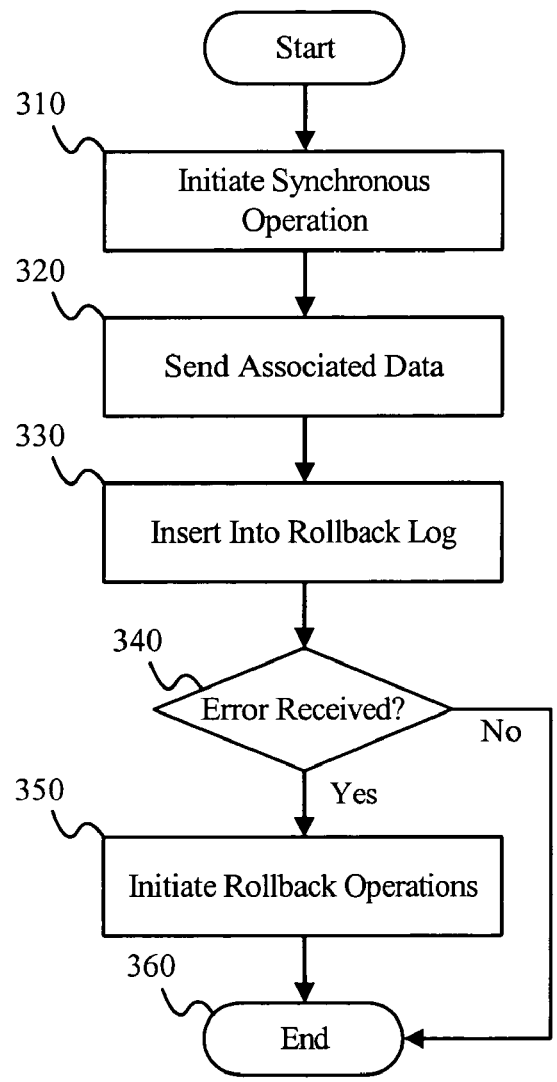
FIG. 3 is a flow chart diagram illustrating one embodiment of a speculative data mirroring method of the present invention.

FIG. 3 is a flow chart diagram illustrating one embodiment of a speculative data mirroring method 300 of the present invention. The depicted embodiment of the speculative data mirroring method 300 includes an initiate synchronous operation step 310, a send associated data step 320, an insert into rollback log step 330, an error received test 340, an initiate rollback operations step 350, and an end step 360. The speculative data mirroring method 300 is conducted from the perspective of a source storage controller, such as the source storage controller 210a of FIG. 2.

The initiate synchronous operation step 310 initiates a synchronous operation, such as a lock operation, on a target volume, such as the target volume 130b. In one embodiment, the mirror control module 214a of FIG. 2 initiates the synchronous operation by sending a command corresponding to the operation to the mirror control module 214b via the transmission link 150. In another embodiment, the mirror control module 214a may initiate the synchronous operation by sending a write command that implies a lock operation to the mirror control module 214b.

The send associated data step 320 sends data such as write data that is associated with the synchronous operation from a source storage controller, such as the source storage controller 210, to a target storage controller, such as the target storage controller 210b. The send associated data step 320 may further include sending data corresponding to write operations from the mirror control module 214a to the mirror control module 214b. In one embodiment, the mirror control module 214a sends the associated data without waiting for correspondence regarding the lock operation from the target storage controller 210b.

The insert into rollback log step 330 may insert a lock command, data corresponding to a write operation, or both into a log such as the rollback log 216a. In one embodiment, the mirror control module 214a inserts data corresponding to write operations conducted on a region of the source volume 130a into the rollback log 216a, and also inserts a lock command for a corresponding region of the target volume 130b into the rollback log 216a. The lock command may be inserted into the rollback log 216a prior to insertion of the write data into the rollback log 214a. In addition, the lock command and data may be inserted into and removed from the rollback log 216a in FIFO order.

The error received test 340 determines whether an error message has been received from a target storage controller, such as the target storage controller 210b. One such error message might indicate that the lock operation was rejected. Another error message may indicate that data corresponding to a write operation was corrupted. In one embodiment, the mirror control module 214a receives the error message from the mirror control module 214b.

If an error message was not received, the method proceeds to the end step 360. If, however, an error message was received, the method proceeds to the initiate rollback operations step 350. In this step 350, the method may resend the lock command or data corresponding to the corrupted write operation to the target storage controller.

In one embodiment, initiating rollback operations 350 includes resending data corresponding to the corrupted write operation and all data or commands that were inserted into the rollback log 216a thereafter. In another embodiment, if the error message indicated that a lock command was rejected, initiating rollback operations 350 may include resending the lock command, in addition to all data or commands that were inserted into the rollback log 216a after the lock command. Alternatively, initiating rollback operations 350 in response to receiving a lock command rejection message may include halting transmission of write data until the lock operation has been successfully executed, then resuming transmission of data, lock commands, or both. Thereafter, the method concludes with the end step 360.

The speculative data mirroring method 300 thus provides rollback operations to recover from errors, such as lock operation rejections and corrupted write data, as well as a method of speculative data transmission. By providing ways to recover from potential errors in the speculative process, the speculative data mirroring method 300 provides a robust method for speculatively mirroring data.

Figure 4:
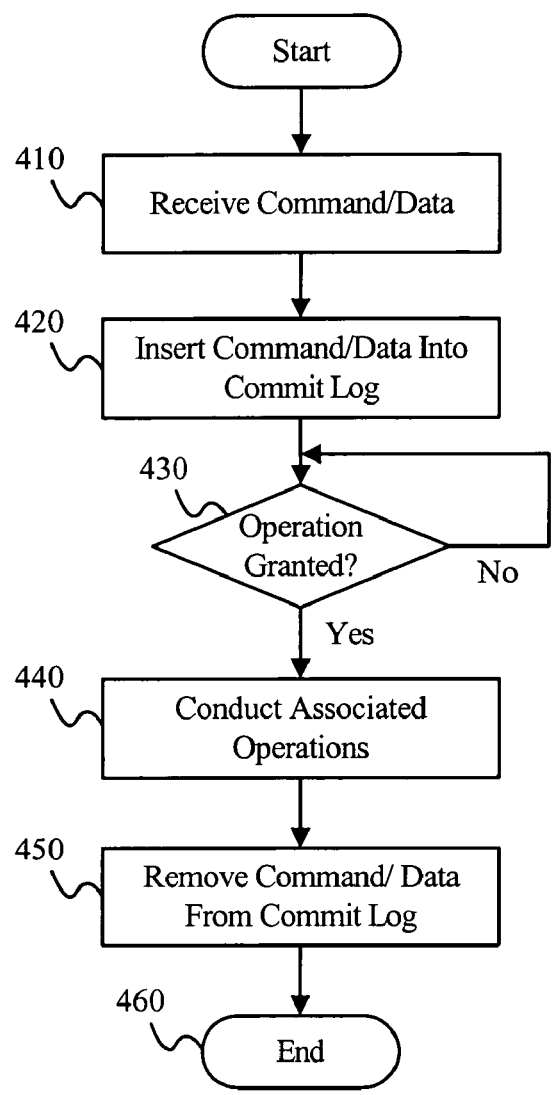
FIG. 4 is a flow chart diagram illustrating another embodiment of the speculative data mirroring method of the present invention.

FIG. 4 is a flow chart diagram illustrating another embodiment of the speculative data mirroring method 400 of the present invention. The depicted embodiment of the speculative data mirroring method 400 includes a receive command/data step 410, an insert command/data step 420, an operation granted test 430, a conduct associated operations step 440, a remove command/data step 450, and an end step 460. The depicted speculative data mirroring method 400 is conducted from the perspective of a target storage controller, such as the target storage controller 210b of FIG. 2.

The receive command/data step 410 may receive a lock command, data corresponding to a write operation, or both. For example, the mirror control module 214b of FIG. 2 may receive a lock command and data corresponding to one or more write operations from the mirror control module 214a via the transmission link 150.

The insert command/data step 420 inserts the received command and associated data into a commit log, such as the commit log 216b. The received command and data may be inserted in a first-in, first-out (FIFO) manner, such that the first command or data inserted into the commit log 216b is the first command or data removed from the commit log 216b.

The operation granted test 430 ascertains whether an operation corresponding to the received command has been granted on a region of the target volume 130b. If the operation such as a lock operation has been granted, the method proceeds to the conduct associated operations step 440. Otherwise, the method loops to the operation granted test 430.

In one embodiment, if the operation granted test 430 ascertains that an operation such as a lock operation has not yet been granted, a module such as the storage control module 212b may create a record of the lock rejection in the target storage controller 210b. This record may prevent the target storage controller 210b from continuing to perform lock operations or the like initiated by the target server 120 on the region of the target storage volume 130b.

The conduct associated operations step 440 performs operations associated with the granted operation, and the remove command/data step 450 removes any commands or data from the commit log 216b associated with the granted operation. For example, one or more write operations associated with a lock operation may be performed in conjunction with the conduct associated operations step 440, and all the commands and data associated with the lock operation may be removed from the commit log 216b in conjunction with the remove command/data step 450.

In one embodiment, the remove command/data step 450 removes a lock command in response to a successful execution of the lock operation corresponding to the lock command on the region of the target volume 130b. In another embodiment, the remove command/data step 450 removes data corresponding to a write operation from the commit log 216b in response to successfully executing the write operation.

The method concludes with the end step 460. The speculative data mirroring method 400 provides an efficient process for a target storage controller to speculatively receive lock operations and data corresponding to write operations.

Figure 5:
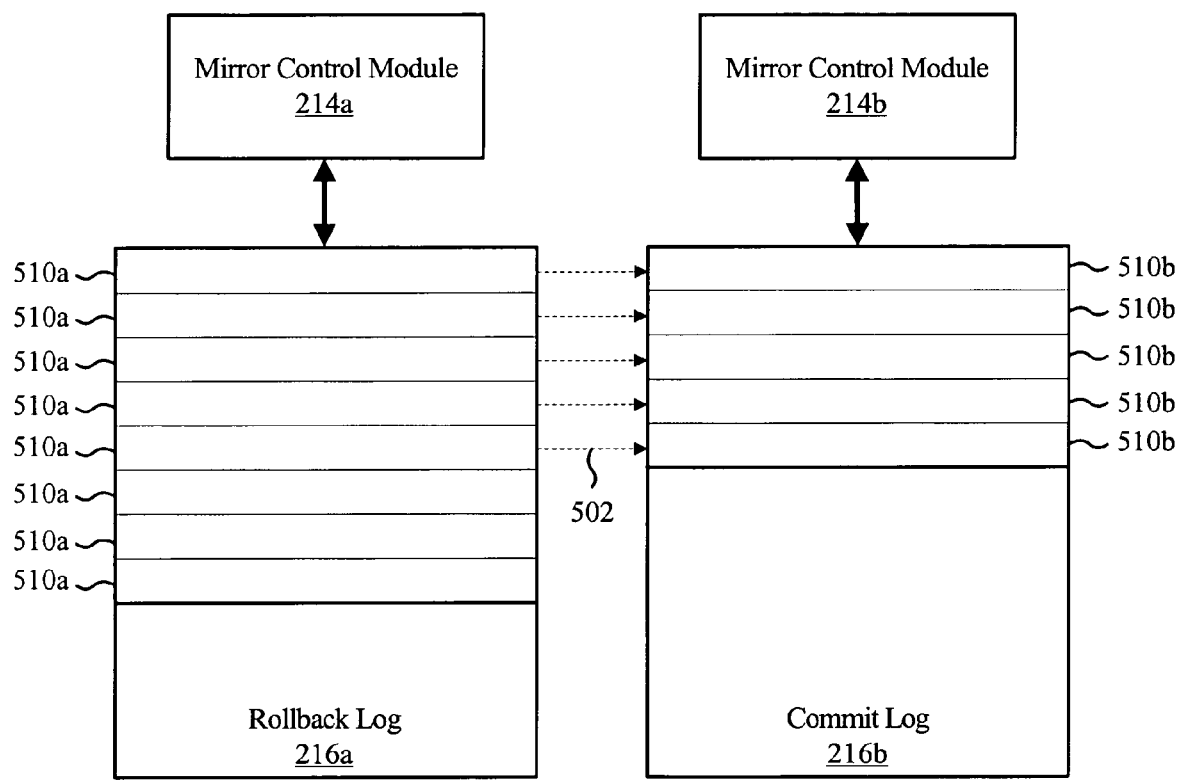
FIG. 5 is a block diagram illustrating in further detail certain aspects of the speculative data mirroring system of FIG. 2 in an intended manner of operation.

FIG. 5 is a block diagram illustrating in further detail certain aspects of the speculative data mirroring system 200 in an intended manner of operation. The depicted speculative data mirroring system 200 is limited to a mirror control module 214a, a mirror control module 214b, a rollback log 216a with entries 510a, and a commit log 216b with entries 510b. The entries 510a show one example of the workings of the logs 216.

In the depicted embodiment, the mirror control module 214a communicates with the mirror control module 214b via a transmission link (not shown) to facilitate speculative transmission of lock commands, data corresponding to write operations, and the like to a target volume, such as the target volume 130b. By facilitating this speculative transmission, the aforementioned elements can overcome performance losses normally associated with synchronous operations, such as lock operations.

In the depicted example, each entry 510a in the rollback log 216a and each entry 510b in the commit log 216b contains data and/or commands associated with operations to be conducted on a target volume. Entries 510a may be inserted into the rollback log 216a and removed from the rollback log 216a by the mirror control module 214a. Similarly, the entries 510b may be inserted into the commit log 216b and removed from the commit log 216b by the mirror control module 214b. In certain embodiments, the data and commands stored in entries 510a correspond respectively to write operations and lock operations that will be conducted on the target volume.

In one embodiment, if an entry 510a contains a lock command, the entry 510a may also include a range of logical block addresses (LBA's) that are to be locked on the target volume, a volume identifier, and the like. The range may correspond to the region of the target volume discussed in conjunction with FIG. 2 and elsewhere. If the entry 510a contains data corresponding to a write operation, the entry 510a may also include metadata for the write operation that indicates where on the target volume to write the data. Metadata may include address information, a volume identifier, or the like.

In certain embodiments, the mirror control module 214a inserts a lock command into the rollback log 216a in response to execution of write operations on a source volume, such as the source volume 130. The mirror control module 214a may also insert data corresponding to the write operations conducted on the source volume into the rollback log 216a. In one embodiment, the mirror control module 214a may also send the lock command and the data corresponding to the write operations to the mirror control module 214b.

In response to receiving the lock command and the data corresponding to the write operations, the mirror control module 214b may insert the lock command and the data corresponding to the write operations into the commit log 216b. Additionally, the mirror control module 214b may send the lock command to a module such as the storage control module 212b, which may in turn attempt a lock operation on a region of the target volume.

Due to system latencies and limited bandwidth of the transmission link, the rollback log 216a may contain more entries than the commit log 216b. The additional entries in the rollback log 216a may represent data or commands that have not yet been sent across the transmission link. In the depicted embodiment, five of the entries 510a have been sent across the transmission link. Each of these sent entries 510a has been inserted into the commit log 216b as entries 510b. Arrows 502 indicate the entries 510a that correspond to the entries 510b.

In response to a successful lock operation on the target volume, the mirror control module 214b may remove the lock command from the commit log 216b and send a confirmation message to the mirror control module 214a indicating that the lock operation was successful. In one embodiment, the mirror control module 214a may remove the lock command from the rollback log 216a in response to receiving the confirmation message.

Likewise, if data corresponding to a write operation is successfully written to the target volume, the mirror control module 214b may remove the data from the commit log 216b and send a confirmation message to the mirror control module 214a indicating that the write operation was successful. In addition, the mirror control module 214a may remove the data from the rollback log 216a in response to receiving the confirmation message.

Conversely, if the lock operation is rejected, the storage control module 212b of FIG. 2 may create a record of the lock rejection. This record may prevent a target storage controller, such as the target storage controller 210b, from continuing to perform lock operations initiated by a target server, such as the target server 120, on the region of the target volume.

If data corresponding to a write operation is corrupted, the mirror control module 214b may send an error message to the mirror control module 214a. In one embodiment, in response to receiving the error message, the mirror control module 214a may resend the data corresponding to the write operation that was received in corrupted form by the mirror control module 214b. In addition, the mirror control module 214a may resend data or commands stored in entries 510a that were inserted into the rollback log 216a subsequent to the entry 510a corresponding to the corrupted data.

By sending subsequent entries 510a, the speculative data mirroring apparatus 200 can ensure that the mirror control module 214b receives an uncorrupted set of data. Thus, the speculative data mirroring system 200 not only speculatively sends synchronous commands and data corresponding to write operations, but also facilitates recovery in case of errors or rejections of the synchronous commands.

Figure 6:
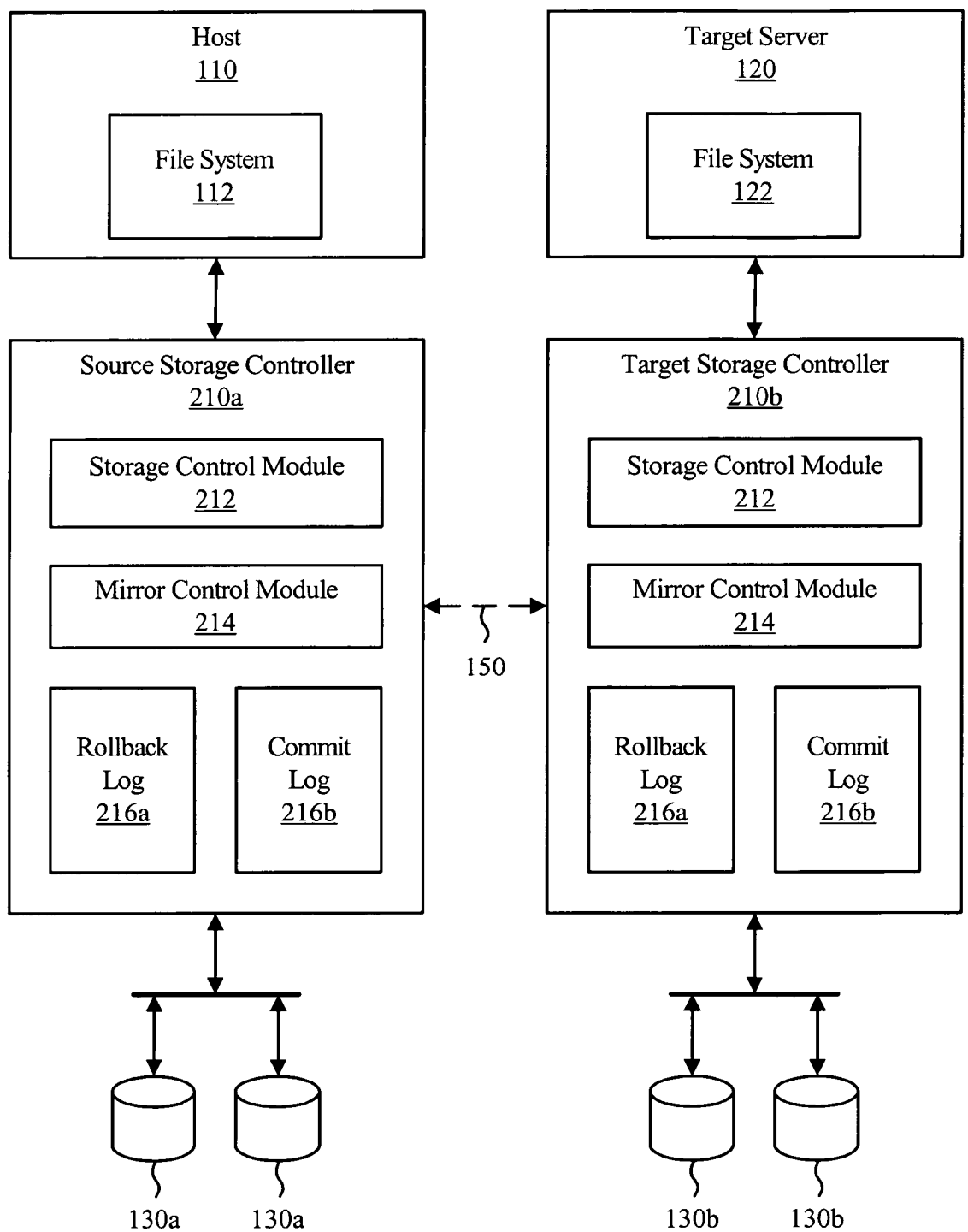
FIG. 6 is a block diagram illustrating one embodiment of a bidirectional speculative data system of the present invention.

FIG. 6 is block diagram illustrating one embodiment of a bidirectional speculative data system 600 of the present invention. The depicted bidirectional speculative system includes many elements of the speculative data mirroring system 200, including a host 110, a file system 112, a target server 120, a file system 122, source storage volumes 130a, target storage volumes 130b, a transmission link 150, a source storage controller 210a, and a target storage controller 210b. However, in addition to a storage control module 212 and a mirror control module 214, each storage controller 210 includes both a rollback log 216a and a commit log 216b.

The depicted bidirectional speculative data system 600 is configured to provide all of the functionality of the speculative data mirroring system 200 in a bidirectional manner. As such, each controller 210 may be both a source and a target of mirror operations.

The bidirectional speculative data mirroring system 600 facilitates mutual data mirroring without adding significant costs to a conventional mirroring system. In addition, such an arrangement may increase system utilization and efficiency. For example, the host computer 110 may be located in a separate time zone from the target server 120. The host computer 110 may write transactions for a business to the source storage volumes 130a during daytime hours in one time zone, while the target server 120 may write transactions for the same business to the target storage volumes 130b during daytime hours in another distant time zone. In order for the host 110 and the target server 120 to contain mirror images of each other, the data from the host 110 may be sent to the target server 120, and the data from the target server 120 may be sent to the host 110 in a bidirectional speculative manner.

The present invention facilitates speculatively performing operations such as lock operations and write operation to remote volumes in a manner that increases system performance. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for speculative data mirroring, the apparatus comprising:
   a rollback log configured to receive write data, the write data corresponding to at least one write operation to a storage region within a source volume;
   a mirror control module configured to initiate a synchronized operation on a corresponding storage region within a target volume; and
   the mirror control module further configured to send the write data corresponding to the at least one write operation to the target volume without waiting for feedback regarding the synchronous operation on the target volume, wherein the synchronous operation must complete prior to writing the write data to the target volume.

2. The apparatus of claim 1, further comprising a source storage controller operably connected to the source volume and a target storage controller operably connected to the target volume.

3. The apparatus of claim 2, further comprising a transmission link operably connecting the source storage controller to the target storage controller.

4. The apparatus of claim 1, wherein the synchronous operation comprises a lock operation comprising a lock command, and the mirror control module is further configured to send the lock command to a target storage controller operably connected to the target volume.

5. The apparatus of claim 4, wherein the mirror control module is further configured to insert the lock command and the data corresponding to the at least one write operation into the rollback log.

6. The apparatus of claim 4, wherein the mirror control module is further configured to send the lock command and the at least one write operation to the target storage controller and the target storage controller is further configured to repetitively attempt to execute the lock command until the target storage region is locked and to write the data to the target storage region in response to obtaining the lock on the target storage region.

7. The apparatus of claim 5, wherein the mirror control module is further configured to remove the lock command from the rollback log in response to successful execution of the lock operation on the target volume.

8. The apparatus of claim 1, wherein the mirror control module is further configured to remove the data corresponding to the at least one write operation from the rollback log in response to successfully writing the data to the target volume.

9. The apparatus of claim 1, wherein the mirror control module is further configured to halt transmission of the data corresponding to the at least one write operation in response to a rejection of the synchronous operation.

10. The apparatus of claim 9, wherein the mirror control module is further configured to resume transmission of the data corresponding to the at least one write operation in response to subsequent execution of the synchronous operation.

11. The apparatus of claim 1, wherein the mirror control module is further configured to initiate retransmission of the data corresponding to the at least one write operation in response to a rejection of the synchronous operation.

12. An apparatus for bidirectional speculative data mirroring, the apparatus comprising:
a first storage control module configured to conduct synchronous storage operations including lock operations on a first storage volume;
a second storage control module configured to conduct synchronous storage operations including lock operations on a second storage volume;
a first mirror control module configured to initiate a lock operation on a storage region within the second storage volume, the first mirror control module further configured to send data corresponding to at least one write operation to the first storage volume without waiting for feedback regarding the lock operation on the second storage volume; and
a second mirror control module configured to initiate a lock operation on a storage region within the first storage volume, the second mirror control module further configured to send data corresponding to at least one write operation to the second storage volume without waiting for feedback regarding the lock operation on the first storage volume.

13. The apparatus of claim 12, wherein the synchronous storage operations comprise a lock operation, and further comprising a first rollback log configured to receive data corresponding to the at least one write operation to the first storage volume and a second rollback log configured to receive data corresponding to the at least one write operation to the second storage volume.

14. A method for speculative data mirroring, the method comprising:

inserting data into a rollback log, the data corresponding to a write operation to a storage region within a source volume;
initiating a synchronous operation on a corresponding storage region within a target volume; and
sending the data corresponding to the write operation to the target volume without waiting for feedback regarding the synchronous operation.

15. The method of claim 14, wherein initiating a synchronous operation comprises sending a lock command to the target volume.

16. The method of claim 14, further comprising removing the data corresponding to the write operation from the rollback log in response to successful execution of the write operation on the target volume.

17. The method of claim 14, wherein inserting data into the rollback log further comprises inserting a lock command into the rollback log.

18. The method of claim 17, further comprising removing the lock command from the rollback log in response to successful execution of the lock command on the target volume.

19. The method of claim 14, further comprising halting transmission of the data corresponding to the write operation in response to rejection of the synchronous operation.

20. The method of claim 19, further comprising resuming transmission of the data stored in the rollback log in response to successful execution of the lock operation.

21. An apparatus for speculative data mirroring, the apparatus comprising:
receiving means configured to receive data corresponding to a write operation to a storage region within a source volume;
initiating means configured to initiate a synchronous operation on a corresponding storage region within a target volume; and
messaging means configured to send the data corresponding to the write operation to the target volume without waiting for feedback regarding the synchronous operation.

22. A system for speculative data mirroring, the system comprising:
a source storage controller operably connected to a source volume;
a target storage controller operably connected to a target volume;
a rollback log configured to recieve data corresponding to a write operation to a storage region within the source volume;
a storage control operably connected to the target storage controller, the storage control module configured to initiate a synchronous operation on a corresponding storage region within the target volume, the synchronous operation comprising a lock operation; and
a mirror control module operably connected to the source storage controller, the mirror control module configured to send the data corresponding to the write operation to the target volume prior to recieving acknowledgement of the lock operation;
where the synchronous operation comprises a lock operation and further comprising a mirror control module operably connected to the source storage controller, the mirror control module configured to send the data corresponding to the write operation to the target volume prior to receiving acknowledgement of the lock operation.

23. A computer readable storage medium comprising computer readable program code for conducting a method of speculative data mirroring, method comprising:
- receiving into a rollback log data corresponding to a write operation, the write operation directed to a storage region within a source volume;
- initiating a synchronous operation on a corresponding storage region within a target volume; and
- sending the data corresponding to the write operation to the target volume prior to receiving acknowledgement of the synchronous operation.

24. The computer readable storage medium of claim 23, wherein initiating a synchronous operation comprises sending a lock command to the target volume.

25. The computer readable storage medium of claim 23, wherein the method further comprises removing the data corresponding to the write operation from the rollback log in response to successful execution of the write operation on the target volume.

26. The computer readable storage medium of claim 23, wherein inserting data into the rollback log further comprises inserting a lock command into the rollback log.

27. The computer readable storage medium of claim 26, the method further comprising removing the lock command from the rollback log in response to successful execution of the lock command on the target volume.

28. The computer readable storage medium of claim 23, the method further comprising halting transmission of the data corresponding to the write operation in response to rejection of the lock operation.

29. The computer readable storage medium of claim 28, the method further comprising resuming transmission of the data stored in the rollback log in response to successful execution of the lock operation.

* * * * *